(12) United States Patent
Zhou et al.

(10) Patent No.: US 7,843,467 B2
(45) Date of Patent: Nov. 30, 2010

(54) SHAPE DEFORMATION

(75) Inventors: Kun Zhou, Beijing (CN); Weiwei Xu, Beijing (CN); Baining Guo, Beijing (CN)

(73) Assignee: Microsoft Corporation, Redmond, WA (US)

( * ) Notice: Subject to any disclaimer, the term of this patent is extended or adjusted under 35 U.S.C. 154(b) by 875 days.

(21) Appl. No.: 11/612,391

(22) Filed: Dec. 18, 2006

(65) Prior Publication Data

US 2008/0143711 A1 Jun. 19, 2008

(51) Int. Cl.
G09G 5/00 (2006.01)
(52) U.S. Cl. .......................... 345/619; 345/647
(58) Field of Classification Search .............. 345/619, 345/647
See application file for complete search history.

(56) References Cited

U.S. PATENT DOCUMENTS

| 5,731,819 | A  | * | 3/1998  | Gagne et al. ............. 345/647 |
| 5,796,400 | A  | * | 8/1998  | Atkinson et al. ........... 345/420 |
| 6,236,403 | B1 | * | 5/2001  | Chaki et al. ............. 345/420 |
| 6,476,804 | B1 | * | 11/2002 | Costabel ............... 345/419 |
| 6,525,744 | B1 | * | 2/2003  | Poggio et al. ........... 345/619 |
| 6,608,631 | B1 | * | 8/2003  | Milliron ............... 345/647 |
| 6,853,745 | B1 |   | 2/2005  | Jacobs et al. |
| 7,061,489 | B2 |   | 6/2006  | Snyder et al. |
| 7,286,127 | B2 | * | 10/2007 | Zhou et al. ............. 345/420 |
| 2003/0179197 | A1 |   | 9/2003  | Sloan et al. |
| 2003/0206183 | A1 | * | 11/2003 | Silverstein ............ 345/647 |
| 2004/0156556 | A1 | * | 8/2004  | Lopez ................ 382/276 |
| 2005/0035965 | A1 |   | 2/2005  | Sloan et al. |
| 2005/0041023 | A1 |   | 2/2005  | Green et al. |
| 2005/0041024 | A1 |   | 2/2005  | Green et al. |
| 2005/0080602 | A1 |   | 4/2005  | Snyder et al. |
| 2005/0083340 | A1 |   | 4/2005  | Sloan et al. |
| 2005/0276441 | A1 |   | 12/2005 | Debevec |
| 2006/0120580 | A1 |   | 6/2006  | Makram-Ebeid et al. |
| 2006/0132486 | A1 |   | 6/2006  | Kim et al. |
| 2006/0214931 | A1 |   | 9/2006  | Snyder et al. |
| 2006/0244757 | A1 | * | 11/2006 | Fang et al. ............ 345/582 |
| 2007/0116381 | A1 | * | 5/2007  | Khamene ............. 382/276 |
| 2007/0229543 | A1 | * | 10/2007 | Liepa et al. ........... 345/647 |
| 2008/0043021 | A1 | * | 2/2008  | Huang et al. .......... 345/428 |
| 2008/0170791 | A1 | * | 7/2008  | Eskildsen et al. ....... 382/199 |

OTHER PUBLICATIONS

Sorkine et al., Laplacian Surface Editing, Eurographics Symposium on Geometry Processing, 2004, pp. 175-184.*

Igarashi et al., As-rigid-as-possible shape manipulation, ACM Siggraph Transactions on Graphics, Jul. 2005, vol. 24, issue 3, pp. 1-8.*

(Continued)

*Primary Examiner*—M Good Johnson
(74) *Attorney, Agent, or Firm*—Hope Baldauf Hartman, LLC (57) ABSTRACT

A method and system is provided for deforming a shape of an image. In one example, an input is received for deforming a displayed shape, the shape including a boundary polygon or outline contour and a local area within the outline contour. The local area may further include vertices and edges. During deformation, an energy function corresponding to the outline contour and the local area may be determined and reduced or minimized. Positioning of the vertices and lengths of the edges may be determined based on the energy function or preservation of coordinates associated with the outline contour and the local area.

14 Claims, 10 Drawing Sheets

OTHER PUBLICATIONS

Terzopoulos et al., Modeling Inelastic Deformation: Viscoelasticity, Plasticity, Fracture, Siggraph '88, Aug. 1-5, 1988, pp. 269-278.*

S. Erturk et al. "3D model representation using spherical harmonics", Electronic Letters, May 22, 2997, vol. 33, No. 11.

Peter-Pike Sloan et al. "Precomputed Radiance Transfer for Real-Time Rendering in Dynamic, Low-Frequency Lighting Environments", Proceedings of the 29th annual conference on Computer graphics and interactive techniques, 2002, pp. 638-647.

Jan Kautz et al. "Fast, Arbitrary BRDF Shading for Low-Frequency Lighting Using Spherical Harmonics", ACM International Conference Proceeding Series; vol. 28, Proceedings of the 13th Eurographics workshop on Rendering, 2002.

Yanlin Weng et al. "2D Shape Deformation Using Nonlinear Least Squares Optimization", The Visual Computer: International Journal of Computer Graphics, Sep. 2006, vol. 22, Issue 9.

Jiaping Wang et al. "Spherical Harmonics Scaling", The Visual Computer: International Journal of Computer Graphics, Sep. 2006, vol. 22, Issue 9.

* cited by examiner

SHAPE DEFORMATION

BACKGROUND

Shapes or images of objects or entities may be presented on a display. A designer may wish to modify the shape, positioning or configuration of a displayed shape. For example, a user may wish to alter a shape of an image of a person, animal, or object. In this case, a user may select a portion of the shape and drag the selected portion to distort or deform the shape.

However, methods for deforming shapes on a display have been impractical as either being too tedious or too laborious. In addition, the resultant deformed shape is often not only physically inaccurate but also requires excessive computation time. Thus, users have typically become frustrated at long computation times for shape deformation to result in shapes with incorrect or inaccurate deformations.

Therefore, there is a need in the art for a method and system for deforming shapes on a display in an accurate and efficient manner.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, a method is described for deforming a shape. The shape may include an outline contour and a local area inside the outline contour and deforming the outline contour and the local area may include computing a corresponding energy function. In this example, the energy function may be reduced or minimized to determine the deformed shape.

In another example, a computer-readable medium is described containing code for performing a method for deforming a shape in which coordinates are identified associated with a boundary polygon of the shape and vertices in a local area within the boundary polygon of the shape. The shape may be deformed based on preservation of coordinates associated with the boundary polygon and the local area of the shape.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
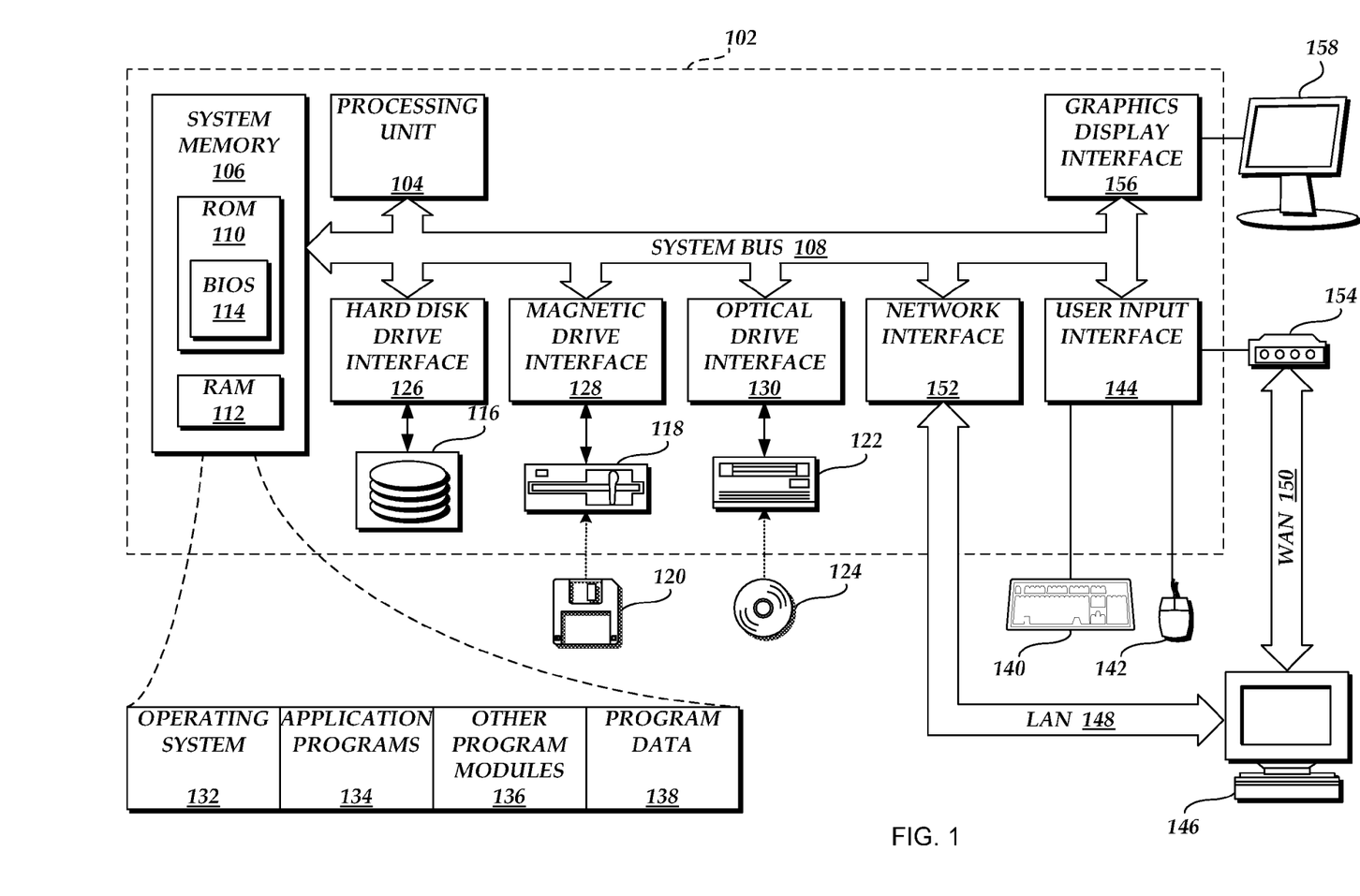
FIG. 1 is a block diagram representing an exemplary computer system into which a method of deformation of images or shapes may be incorporated.

FIG. 1 illustrates an example of a suitable computing system environment 100 on which a method of deformation of images or shapes may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 102. Components of computer 102 may include, but are not limited to, a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 102 typically includes a variety of computer readable media. Computer readable media can be any available media that can be accessed by computer 102 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 102. Combinations of the any of the above should also be included within the scope of computer readable storage media.

The system memory 106 includes computer storage media in the form of volatile and/or nonvolatile memory such as read only memory (ROM) 110 and random access memory (RAM) 112. A basic input/output system 114 (BIOS), containing the basic routines that help to transfer information between elements within computer 102, such as during start-up, is typically stored in ROM 110. RAM 112 typically contains data and/or program modules that are immediately accessible to and/or presently being operated on by processing unit 104. By way of example, and not limitation, FIG. 1 illustrates operating system 132, application programs 134, other program modules 136, and program data 138.

The computer 102 may also include other removable/non-removable, volatile/nonvolatile computer storage media. By way of example only, FIG. 1 illustrates a hard disk drive 116 that reads from or writes to non-removable, nonvolatile magnetic media, a magnetic disk drive 118 that reads from or writes to a removable, nonvolatile magnetic disk 120, and an optical disk drive 122 that reads from or writes to a removable, nonvolatile optical disk 124 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 116 is typically connected to the system bus 108 through an non-removable memory interface such as interface 126, and magnetic disk drive 118 and optical disk drive 122 are typically connected to the system bus 108 by a removable memory interface, such as interface 128 or 130.

The drives and their associated computer storage media discussed above and illustrated in FIG. 1, provide storage of computer readable instructions, data structures, program modules and other data for the computer 102. In FIG. 1, for example, hard disk drive 116 is illustrated as storing operating system 132, application programs 134, other program modules 136, and program data 138. Note that these components can either be the same as or different from additional operating systems, application programs, other program modules, and program data, for example, different copies of any of the elements. A user may enter commands and information into the computer 146 through input devices such as a keyboard 140 and pointing device 142, commonly referred to as a mouse, trackball or touch pad. Other input devices (not shown) may include a microphone, joystick, game pad, satellite dish, scanner, or the like. These and other input devices are often connected to the processing unit 104 through a user input interface 144 that is coupled to the system bus, but may be connected by other interface and bus structures, such as a parallel port, game port or a universal serial bus (USB). A monitor 158 or other type of display device is also connected to the system bus 108 via an interface, such as a video interface or graphics display interface 156. In addition to the monitor 158, computers may also include other peripheral output devices such as speakers (not shown) and printer (not shown), which may be connected through an output peripheral interface (not shown).

The computer 102 may operate in a networked environment using logical connections to one or more remote computers, such as a remote computer. The remote computer may be a personal computer, a server, a router, a network PC, a peer device or other common network node, and typically includes many or all of the elements described above relative to the computer 102. The logical connections depicted in FIG. 1 include a local area network (LAN) 148 and a wide area network (WAN) 150, but may also include other networks. Such networking environments are commonplace in offices, enterprise-wide computer networks, intranets and the Internet.

When used in a LAN networking environment, the computer 102 is connected to the LAN 148 through a network interface or adapter 152. When used in a WAN networking environment, the computer 102 typically includes a modem 154 or other means for establishing communications over the WAN 150, such as the Internet. The modem 154, which may be internal or external, may be connected to the system bus 108 via the user input interface 144, or other appropriate mechanism. In a networked environment, program modules depicted relative to the computer 102, or portions thereof, may be stored in the remote memory storage device. By way of example, and not limitation, remote application programs may reside on a memory device. It will be appreciated that the network connections shown are exemplary and other means of establishing a communications link between the computers may be used.

Figure 2A:
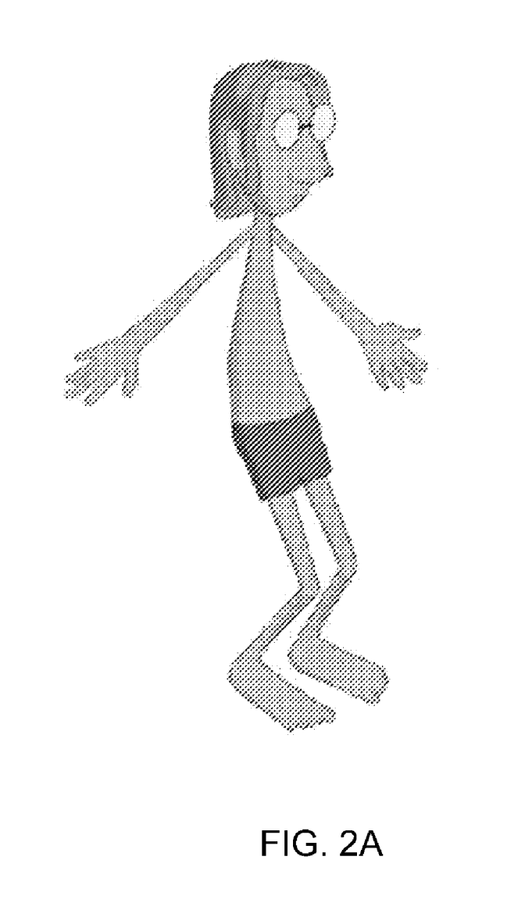
FIGS. 2A-2C illustrate an example of an image of an entity and deformation of the entity.
Figure 2B:
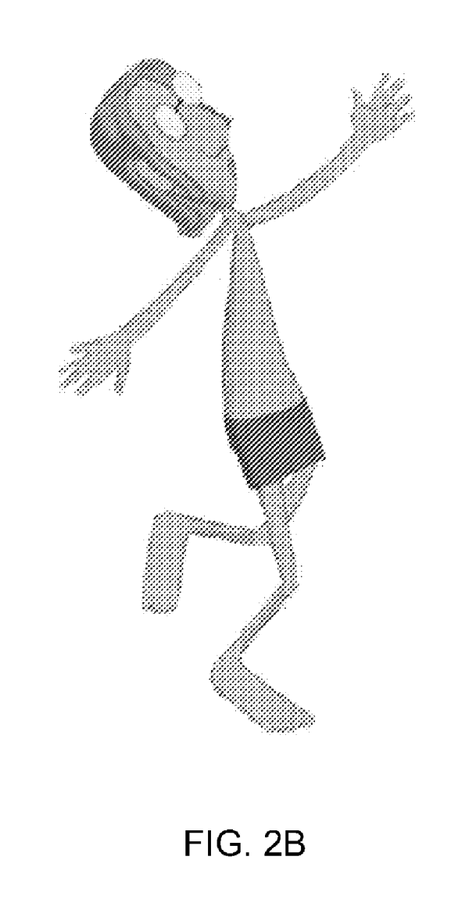
Figure 2C:
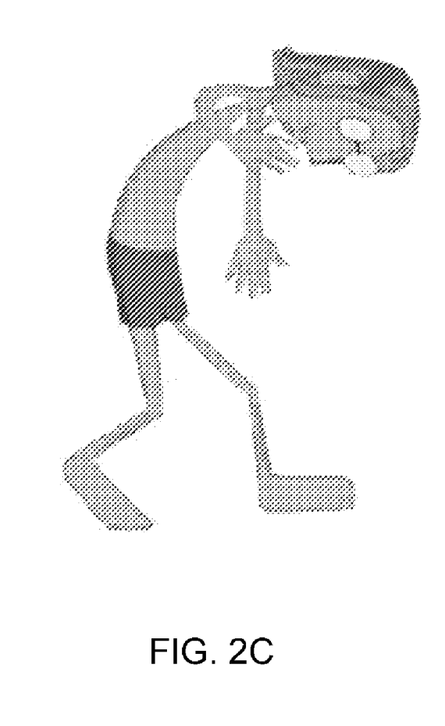

A method and system for providing deformation of images of objects or other entities is described. The image may include a computer-generated image of any deformable or otherwise modifiable entity or object such as a 2-dimensional image. FIGS. 2A-2C illustrate an example of an image of an entity and deformation of the image of the entity. FIG. 2A represents an example of an image of a person. The image of the person is modifiable according to the method and system described herein. FIG. 2B illustrates an example of deformation of the figure of FIG. 2A in which portions of the image are moved to alternative positions. Such movement of portions of the image and corresponding adaptation in the image provide an appearance of movement of the object or entity. FIG. 2C illustrates another example of an alternative modification of the image such that portions of the image depicted in FIG. 2A or FIG. 2B may be moved or deformed to form a character in a particular configuration. In this example, movement and/or deformation of the image may appear natural and may also preserve additional features of the original image as described below.

In one example of the method for generating and deforming/modifying images, a 2-dimensional image may be received in a system for rendering and/or display. The image may be any type of image and may include any type of object or entity. In one example, the image may be a vector graphic in which the image depicted may include a contour outline or a boundary polygon. The contour outline or boundary polygon may be an outermost outline of the image or the periphery of the image. Alternatively, the image may be a bitmap image in which a tracing process may be applied to the bitmap image to provide the boundary polygon or contour outline of the object/entity. For example, the background of the bitmap image may be removed and a boundary polygon or contour outline may be generated for the remaining image by any number of methods. In one example, automatic silhouette tracing may be used in a marching squares algorithm to generate bounding polygons of the image. Also, additional points may be inserted into the contour with connection of vertices of the added points and points on the contour outline or bounding polygon.

Figure 3A:
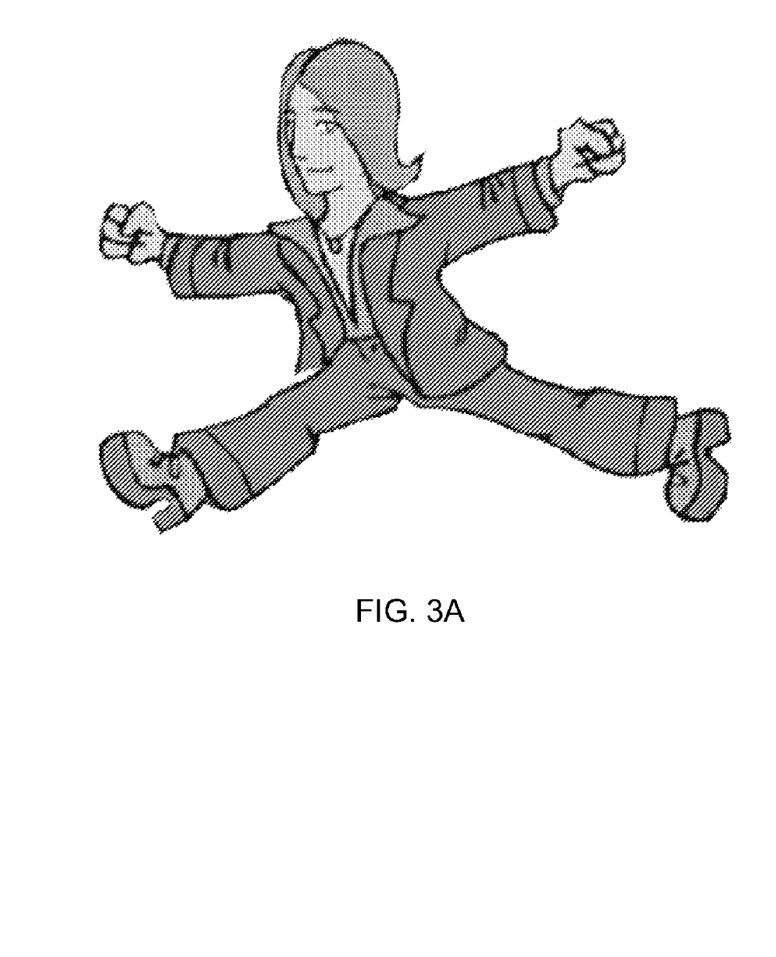
FIGS. 3A and 3B illustrate an example of a 2-dimensional shape.
Figure 3B:
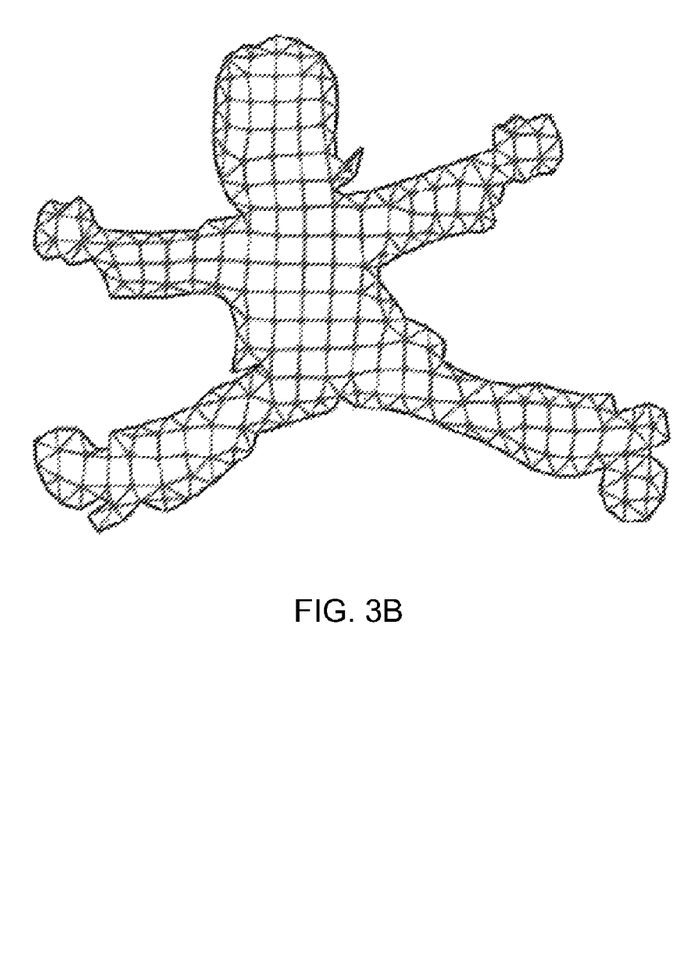

FIGS. 3A and 3B illustrate an example of a 2-dimensional shape. As FIG. 3A illustrates, a 2-dimensional image is provided and a bounding polygon or contour outline is determined corresponding to the image (e.g., the periphery of the image). Also, additional points may be added within the bounding polygon of the identified image. FIG. 3B illustrates points added to the interior of the bounding polygon or contour outline of the image with connection of the points with other points or points on the contour outline by edges forming inner polygons within a boundary polygon. Hence, edges connect points in the image. Deformation of the image may be performed based on the points or vertices and edges in the image including the contour outline or boundary polygon of the image.

In one example, an energy function associated with deformation of the image may be reduced, decreased, diminished or even minimized. The energy function may include any number of elements. For example, decreasing the energy function may include preserving coordinates associated with the contour outline or boundary polygon of the image. Such coordinates may include but are not limited to Laplacian coordinates that may represent local details of the contour outline or boundary polygon of the image. In another example, decreasing the energy function may include preserving coordinates and components associated with local areas inside a boundary polygon or contour outline of the image. For example, decreasing the energy function may include preserving mean value coordinates or edge lengths. Mean value coordinates may be associated, for example, with inner points of a bounding polygon and a relative position with respect to neighboring points during deformation of the image and edge lengths may be associated with the length of connecting edges between points within the bounding polygon or outline contour. Thus, decreasing an energy function associated with deformation of the shape of the image may include preserving the mean value coordinates and/or preserving the length of edges during deformation. The above describes examples of factors for decreasing energy of deformation, however, the present description is not so limited as any number of other factors may be used for establishing, decreasing, diminishing, reducing or even minimizing energy during deformation of an image.

As an additional example, position constraints may be provided either internally or provided from an external source such as received from a user. Position constraints may specify placement of points, restrictions in point or edge deformation and/or movement and may also be used to decrease an energy function associated with deformation of an image as described herein.

Any of the factors may be combined to determine reduced or minimized energy. In one example, a combination of factors for decreasing energy of deformation may be determined using a nonlinear least squares approach as described herein.

Figure 4:
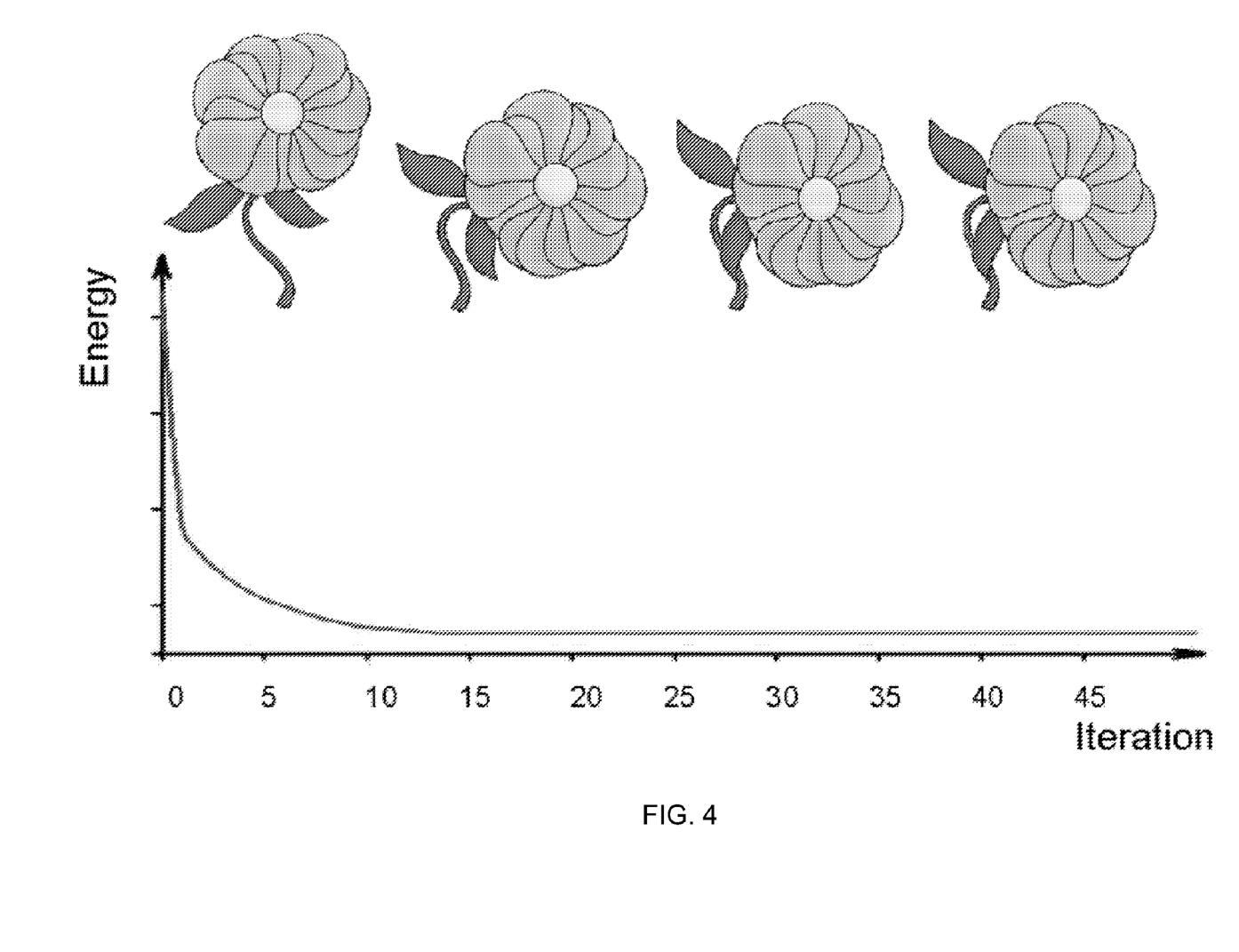
FIG. 4 illustrates a decrease in energy during deformation of an image.

FIG. 4 illustrates a decrease in energy during deformation of an image in an iterative process (as illustrated along the top of FIG. 4). During each iteration of the method for decreasing energy in deformation of an image, energy decreases as illustrated in FIG. 4. In this example, the level of energy approaches a minimum value after approximately ten iterations as the energy level converges to a certain level. The energy may be determined by using a nonlinear least squares approach.

Figure 6:
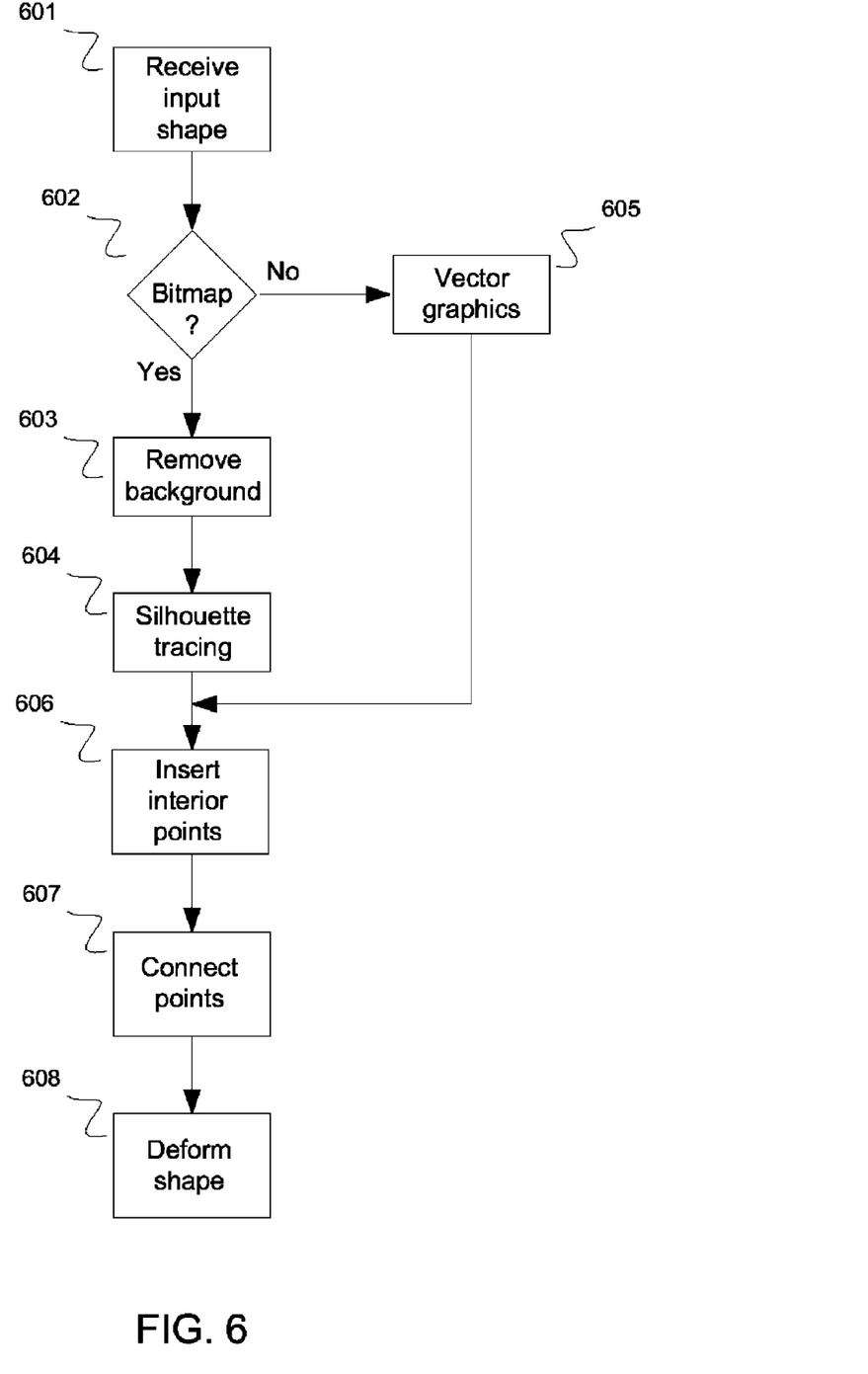
FIG. 6 is a flowchart illustrating one example of a method for deformation of a shape.

FIG. 6 is a flowchart illustrating one example of a method for deformation of a shape. In STEP 601, an input shape is received. For example, a 2-dimensional image may be received of any object or entity. This image may be received from an external source such as a user and may be of any type. The system may further identify the type of image that is received. For example, the image may be a bitmap image ("Yes" branch of STEP 602) or a vector-based graphic ("No" Branch of STEP 602, STEP 605). If the image is a bitmap image, the system may further remove the background of the image (STEP 603) and/or trace the silhouette (STEP 604) to form an outer contour outline or boundary polygon of the image. Any tracing method may be used to provide the tracing of the outer contour outline. As one example, a marching squares method may be applied to obtain a boundary polygon or outline contour, however, any method for tracing of the boundary polygon or outline contour of the image may be used.

In STEP 606, interior points may be inserted into the interior region of a shape. Any number of points at any location within the interior region of the shape may be inserted. From the inserted points, an interior graph may be created from the points added to the interior region of the shape. For example, the interior graph may be created by connecting vertices of the boundary polygon to inside points. Also, interior points may be connected to other interior points to form the internal graph (STEP 607). Deformation or other modification of the image may be performed in relation to the points and edges in the image (STEP 608). For example, the system may receive an input from a user indicating a point or an edge for movement or deformation. The user input may include a selection of a point or edge and an indication of a direction of movement of the selected point or edge.

Figure 7:
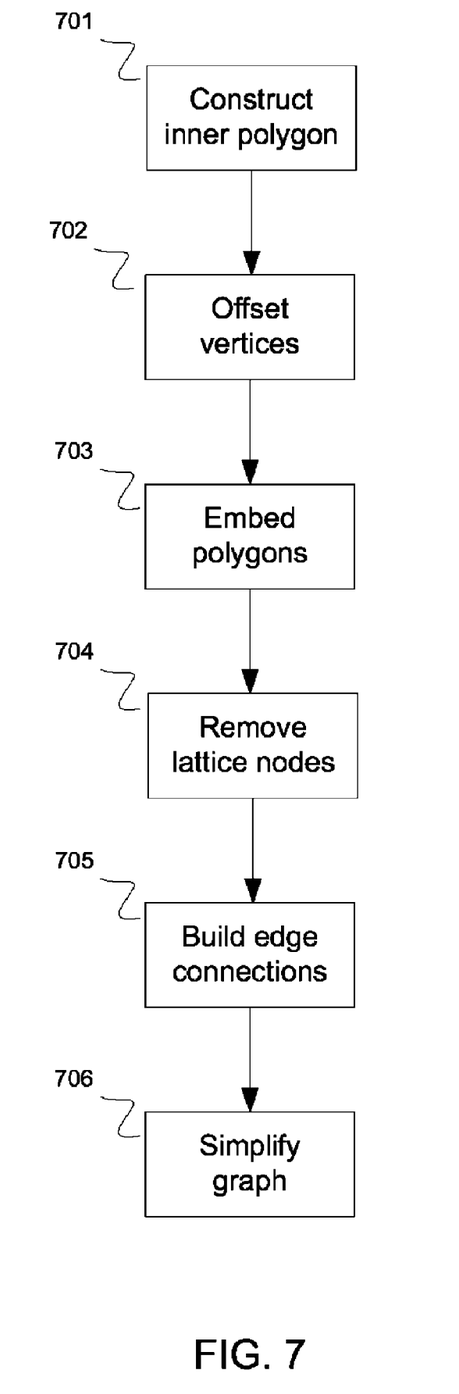
FIG. 7 is a flowchart illustrating one example of a method for adding interior points within a boundary polygon or image contour outline.
Figure 8A:
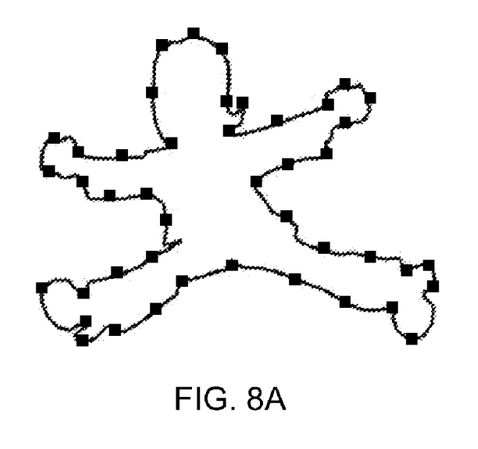
FIGS. 8A-8E illustrate an example of insertion of interior points within a boundary polygon or image contour outline.
Figure 8B:
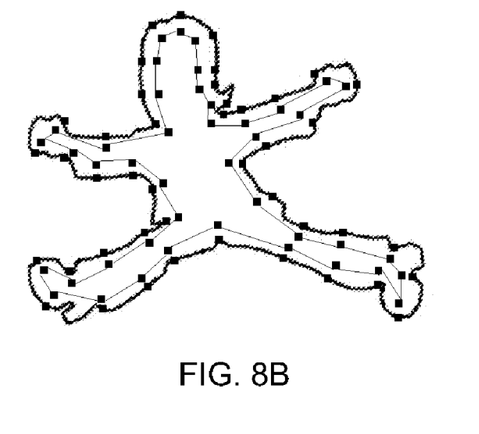
Figure 8C:
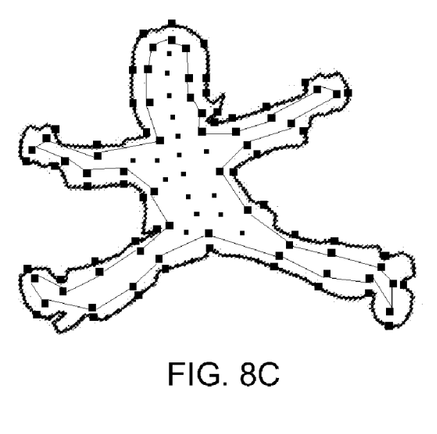

Interior points may be added within a boundary polygon in a variety of ways. In one example, interior points may be added by forming a 2-dimensional graph. FIG. 7 is a flowchart illustrating one example of a method for adding interior points within a boundary polygon or image contour outline. FIGS. 8A-8E illustrate an example of insertion of interior points within a boundary polygon or image contour outline. In STEP 701, an inner polygon is constructed. The inner polygon is constructed within a boundary polygon corresponding to the boundary polygon of the image. In one example (STEP 702, FIG. 7), an inner polygon is created by offsetting each vertex a distance in the direction opposite its normal. As illustrated in FIG. 8A, a boundary polygon corresponding to a shape as illustrated in FIG. 3A with vertex points is created. In FIG. 8B each vertex point is offset a distance in a direction opposite its normal to create an inner boundary within the boundary polygon or outer contour outline. In STEP 703, additional lattice nodes are embedded into the interior of the polygon to create polygons within the inner boundary or the offset vertex points (STEP 703). As illustrated in FIG. 8C, lattice points are added to the interior of the boundary polygon and within the inner boundary. Also illustrated in FIG. 8C, lattice points outside of the inner boundary are removed (STEP 704).

Figure 8D:
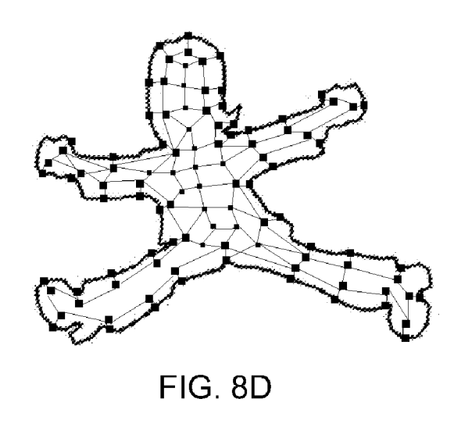
Figure 8E:
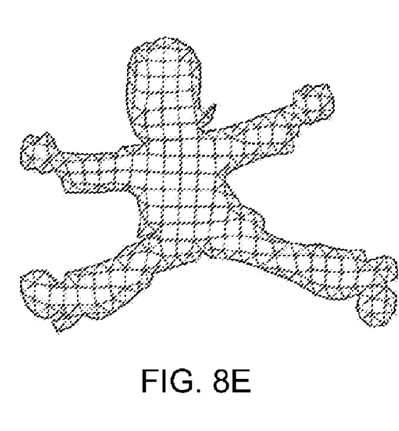

In STEP 705, edge connections are created. As illustrated in FIG. 8D, edge connections are created between internal lattice points and between internal lattice points and the inner boundary nodes and boundary polygon nodes. Thus, inner polygons embedded within the interior of the boundary polygon create a graph of embedded polygons. Also, the graph may be simplified as illustrated in FIG. 8E (STEP 706). In simplifying the graph, the edges and/or lattice points may be further processed. In this example, the graph is simplified with edge collapse and graph smoothing.

The graph may include total vertices n belonging to a set V and a total set of edges belonging to set E. The set of vertices V may further be divided into subsets. For example, a subset of V, $V_p$, may contain m vertices of the boundary polygon while another subset of V, $V_g$, may contain (n-m) interior points.

Figure 9:
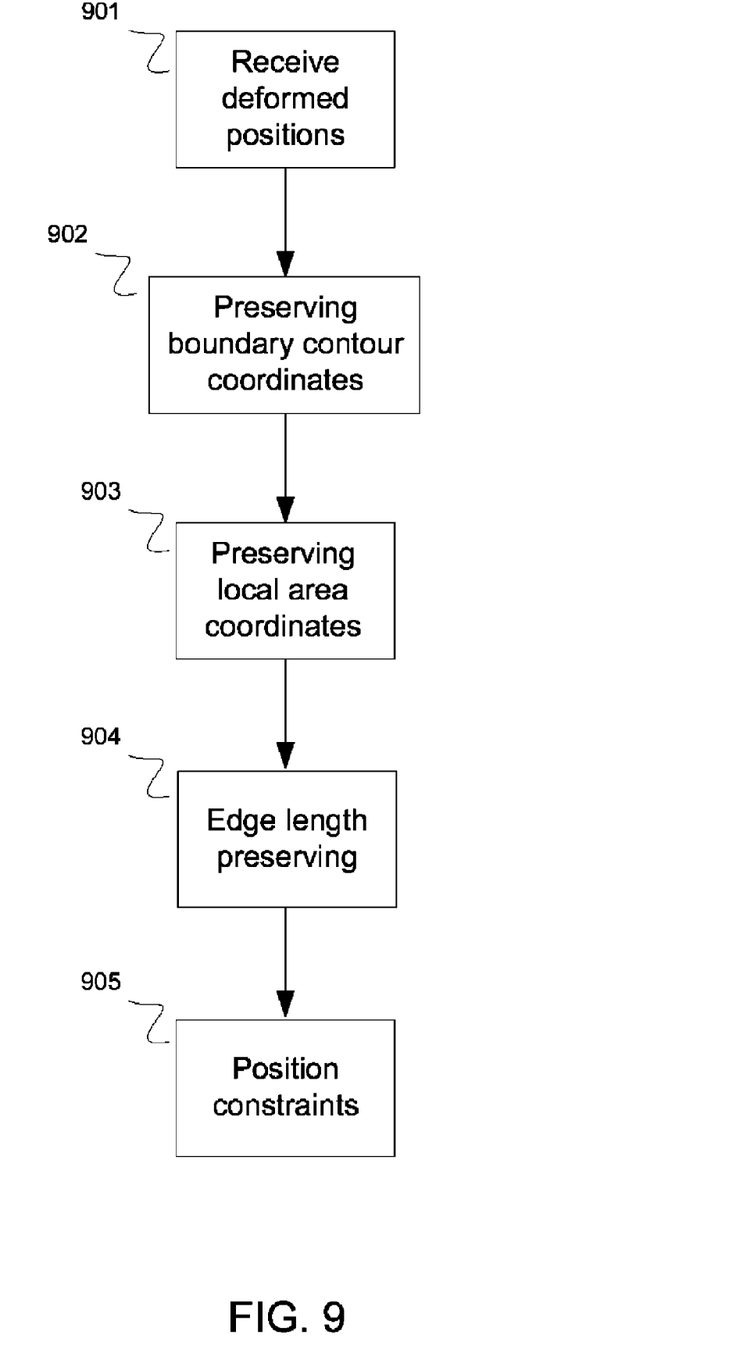
FIG. 9 is a flowchart illustrating a method of deformation of an image.

In addition, the image and corresponding graph may be modified. For example, a user may desire to move, adjust or deform a portion of the image. In this example, the user may input an indication of movement or alteration of at least one point or edge in the graph of the image such that a portion of the image may be deformed, moved, bent, etc. The system may determine deformation of the image while having a decreased energy level during the deformation. FIG. 9 is a flowchart illustrating a method of deformation of an image in which local properties are determined to decrease an energy function associated with the local properties during deformation.

Figure 10A:
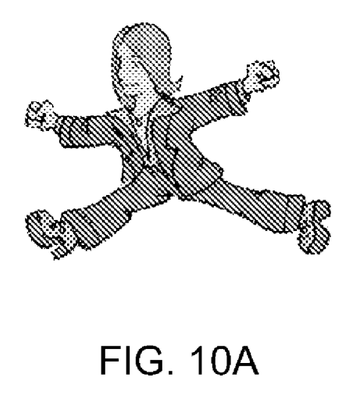
FIGS. 10A-10D illustrate an example of deformation of an image.
Figure 10B:
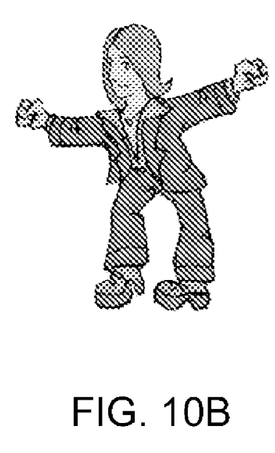
Figure 10C:
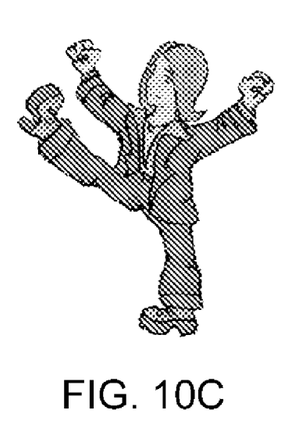
Figure 10D:
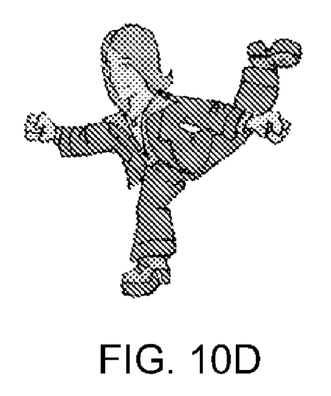

In STEP 901, deformation positions may be determined. The deformation positions may be received, for example, by a user. Alternatively or additionally, the deformation positions may be stored in memory or may be predetermined. If the deformation positions are received from a user, the user may input a selection of points on a graph corresponding to the image and may indicate movement of the points to deform the shape of the image such as, for example, by dragging an input device. Deformation of the image may include any alteration of the image such as movement of a portion of the image or a modification in the image to change its configuration. FIGS. 10A-10D illustrate an example of deformation of an image. FIG. 10A illustrates an original shape of the image and FIGS. 10B-10D illustrate various deformations of the original image of FIG. 10A.

In STEP 902 (FIG. 9), coordinates associated with a boundary polygon or outline contour of the image may be determined for the deformation. The identified coordinates may further be preserved to reduce an energy level or function associated with the deformation of the boundary polygon or outline contour of the image. In one example, the coordinates of the boundary polygon or outline contour include Laplacian coordinates that are determined for the deformation. In this example, Laplacian coordinates associated with the boundary polygon of the image are determined and preserved and an energy function corresponding to the Laplacian coordinates may be diminished, reduced, decreased, or even minimized.

For each coordinate of the boundary polygon in the image (e.g., $V_p$), a curve Laplacian is defined. In one example, a curve Laplacian coordinate $\delta_i$ of point $v_i$ is the difference between $v_i$ and the average of its neighbors on the curve as follows:

$$\delta_i = L_p(v_i) = v_i - (v_{i-1} + v_{i+1})/2$$

where $v_{i-1}$ and $v_{i+1}$ are points adjacent to $v_i$ on the curve and $L_p$ is a Laplace operator of the curve.

During deformation of the image in this example, the Laplacian coordinates are preserved by decreasing energy in a corresponding energy function as follows:

$$\sum_{v_i \in V_p} \|\mathcal{L}_p(v_i) - \delta_i\|^2 = \|L_p V_p - \delta(V_p)\|^2 \text{ (matrix form)} \quad \text{(Eq. 1)}$$

Where $V_p$ represents point positions on a boundary polygon, $L_p$ represents a Laplace matrix (e.g., an m×m matrix), and $\delta$ is a vector of Laplacian coordinates and general function of the point positions $V_p$. Zero elements may be added to the Laplace matrix $L_p$ to expand the matrix to an m×n matrix L such that preserving the Laplacian coordinates during deformation may be represented as follows:

$$\|LV - \delta(V)\|^2 \quad \text{(Eq. 2)}$$

In STEP 903, local area coordinates associated with interior points and vertices in the image are determined and an energy level or function corresponding to the local area coordinates during deformation of the image may be reduced and/or minimized. One example of local area coordinates includes mean value coordinates. In this example, reducing an energy function corresponding to the mean value coordinates of the local area or interior areas of the image includes maintaining relative positions of interior points during deformation of the image. Maintaining the relative position of the interior points ($v_i$) of the image with respect to neighboring point in the image in the subset $V_g$ via the mean value coordinates associated with the interior points may be expressed through a weight function as follows:

$$w_{i,j} = \frac{\tan(\alpha_j/2) + \tan(\alpha_{j+1}/2)}{|v_i - v_j|}$$

Where $\alpha_j$ represents an angle formed by vector $v_j - v_i$ and $v_{j+1} - v_i$. The mean value coordinates of $v_i$ with respect to its neighboring points may be determined by normalizing each weight function $w_{i,j}$ by the sum of all weight functions. Thus, $$v_i - \sum_{(i,j) \in E} w_{i,j} * v_j = 0, \text{ for } v_i \in V_g$$

which may be represented in the following matrix form:

$$M_g V_g = 0,$$

where $M_g$ comprises a (n-m)×(n-m) matrix into which zero elements may be added to expand the matrix into an (n-m)×n matrix M. Thus, minimizing an energy function may preserve mean value coordinates during deformation, the energy function represented as follows:

$$\|MV\|^2 \quad \text{(Eq. 3)}$$

Additional coordinates associated with local areas of the image may be determined and a corresponding energy function associated with the additional coordinates may also be reduced or minimized during deformation. FIG. 9 illustrates an example of determining additional local area coordinates of the image (STEP 904). In this example, the additional coordinates includes edge lengths that may be preserved during deformation. Edge length changes may be associated with the following energy formula:

$$\sum_{(i,j) \in E_g} \|(v_i - v_j) - e(v_i, v_j)\|^2 \quad \text{(Eq. 4)}$$

Where $$e(v_i, v_j) = \frac{\tilde{l}_{i,j}}{l_{i,j}}(v_i - v_j);$$

$l_{i,j}$ being the current length of edge (i,j) and $\tilde{l}_{i,j}$ being the original length before deformation.

Computing the energy associated with each edge in vector form, the energy as set forth in equation 4 above may be represented in matrix form as follows:

$$\|HV - e(V)\|^2 \quad \text{(Eq. 5)}$$

where H is a $|E_g| \times n$ matrix.

Further, in STEP 905, position constraints may be applied to compute the positions of points of the image in the deformed state. The position constraints may be predetermined, for example. Alternatively or additionally, the position constraints may be received from an external source. In one example, a user may provide position constraints. For example, position constraints as provided or specified by a user may be presented as follows:

$$\|CV - U\|^2$$

wherein C is a $|S| \times n$ matrix and U is a vector of dimension $|S|$ representing the target positions provided or specified by the user. In yet another example, a user may specify weighting for each factor in the energy function. For example, a user may input any number of weighting parameters associated with each corresponding factor in the energy function where each of the weighting parameters indicates a weight of a corresponding energy factor. The factors may further be combined with associated weighting factors to determine relevance of each factor in an energy equation.

A combination of energy terms associated with each of boundary polygon or outline contour coordinates and local area coordinates may be minimized to determine positions of points of the shape in the deformed state. For example, the Laplacian coordinate, mean value coordinates, edge length and position constraints may be combined as follows:

$$\|L_p V_p - \delta(V_p)\|^2 + \|MV\|^2 + \|HV - e(V)\|^2 + \|CV - U\|^2 \quad \text{(Eq. 6)}$$

Which may be further expressed in the following simplified form:

$$\min_V \|AV - b(V)\|^2 \quad \text{(Eq. 7)}$$

Where $$A = \begin{pmatrix} L \\ M \\ H \\ C \end{pmatrix}, \text{ and } b(V) = \begin{pmatrix} \delta(V) \\ 0 \\ e(V) \\ U \end{pmatrix}$$

Thus, in this example, the matrix A depends on the graph of the shape before deformation and b depends on current point positions V. Also in this example, the deformation positions are determined with a nonlinear least squares approach without using a linear approximation and without removing the dependence of b and V. Hence, the nonlinear least squares is computed directly in this example.

In one example of a non-linear least squares determination, energy associated with a deformation may be expressed iteratively in an interactive Gauss-Newton method as follows:

$$\min_{V^{k-1}} \|AV^{k+1} - b(V^k)\|^2 \quad \text{(Eq. 8)}$$

Where $V^k$ represents point positions for the k-th iteration and $V^{k+1}$ represents point positions to be determined at iteration k+1. As seen in Equation 8, b is dependent on the current point position $V^k$, which is the current iteration and therefore, known. Therefore, solving equation 8 by a least squares system provides the following:

$$V^{k+1} = (A^T A)^{-1} A^T b(V^k) = Gb(V^k). \quad \text{(Eq. 9)}$$

Where $G = (A^T A)^{-1} A^T$. Because in this example A is dependent only on the graph before deformation, G may be precomputed before deformation and fixed during deformation. In this way a back substitution may be executed for each iteration and the process may be run interactively.

In this example, the nonlinear least squares optimization may be performed interactively. In each iteration, b may be computed based on point positions from a previous iteration (e.g., $V^k$). Thus, in each iteration, $\delta(V^k)$ and $e(V^k)$ are determined. For example, $e(V^k)$ may be determined as follows:

$$e(v_i^k, v_j^k) = \frac{\tilde{l}_{i,j}}{|v_i^k - v_j^k|}(v_i^k - v_j^k), \text{ for } (i,j) \in E_g$$

Also, $\delta(V^k)$ may be determined by determining a transform matrix for each point $v_i \in V_p$. If the transform matrix is $T_i^k$, then the curve Laplacian coordinates may be represented as:

$$\delta(v_i^k) = T_i^K \delta(v_i^0)$$

Where $\delta(v_i^0)$ comprises the curve Laplacian coordinate before deformation. In addition, the transform matrix $T_i^k$ may be determined when $v_i^0$ and $v_i^k$ are taken as rotation centers by minimizing the following energy equation:

$$\sum_{(i,j) \in E_p} \|T_i^k(v_j^0 - v_i^0) - (v_j^k - v_i^k)\|^2$$

Hence the transform matrix $T_i^k$ may be expressed in simplified form as follows:

$$T_i^k = \sum_{(i,j) \in E_p} (v_j^k - v_i^k)(v_j^0 - v_i^0)^T D_i$$

Where $$D_i \left( \sum_{(i,j) \in E_p} (v_j^0, v_i^0)(v_j^0 - v_i^0)^T \right)^{-1}$$

In another example, $D_i$ may depend on the original shape only and may be pre-computed.

Figure 5A:
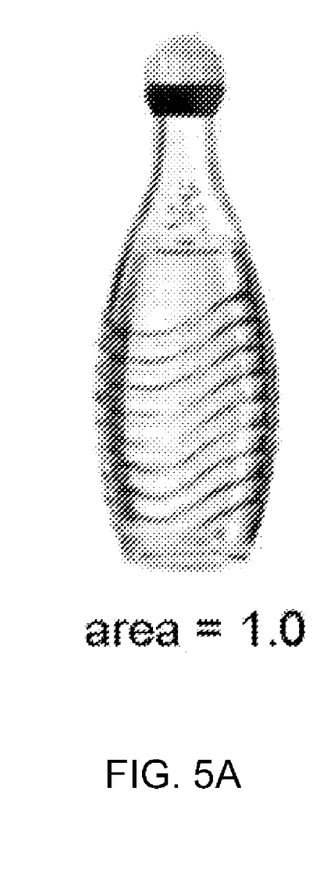
FIGS. 5A-5C illustrate an example of compression of an image.
Figure 5B:
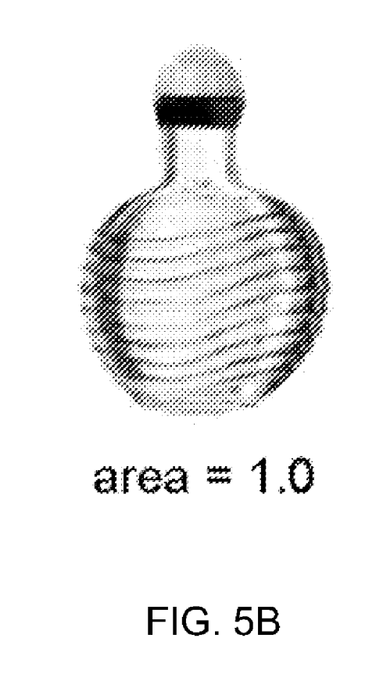
Figure 5C:
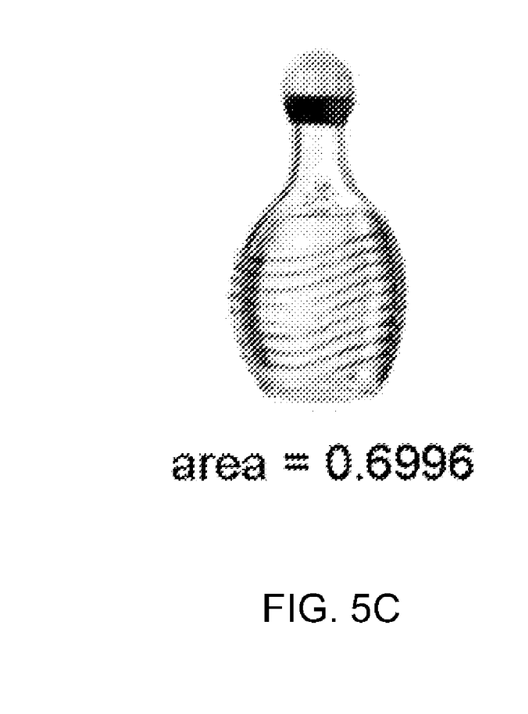

In addition, a global area may be preserved as a shape is altered or deformed. In one example, compression of an incompressible shape of an image is simulated while the global area of the image is preserved. Also in this example, a hard constraint may be applied to the global area in a nonlinear least squares approach. Thus, the global area is preserved during deformation or compression of the image using nonlinear least squares. FIGS. 5A-5C illustrate an image being compressed. FIG. 5A illustrates an image of a bottle having a certain area size. FIG. 5B illustrates the image of FIG. 5A after compression of the image. With global area preservation, the area size remains approximately and substantially the same after the image is compressed. FIG. 5C illustrates an example in which global area preservation is not performed. In the example of FIG. 5C, the image is compressed, however, the area also decreases because the global area is not constrained in the example illustrated in FIG. 5C.

In one example, global area preservation may be a hard constraint simulated using a nonlinear least squares process as described herein. For example, an area of a boundary polygon may be determined from coordinates of points on the polygon as follows:

$$g(V_p) = \frac{1}{2}\sum_{i=0}^{m}(x_i y_{i+1} - x_{i+1} y_i)$$

Where $(x_i, y_i)$ represents the coordinates of a point $v_i$. The global area constraint may further be represented as follows:

$$g(V) - \tilde{g} = 0$$

Where $\tilde{g}$ represents the area of the original shape prior to deformation. In this example, the global area constraint comprises a nonlinear function of the coordinates of points on the polygon and may further be applied as a hard constraint. Thus, equation 7 from above may be extended to include the global area constraint as follows:

$$\min_{V}\|AV - b(V)\|^2, \text{ and } g(V) - \tilde{g} = 0 \quad \text{(Eq. 10)}$$

In addition, equation 8 may also be extended to include the constrained nonlinear least squares problem of global area preservation as follows:

$$\min_{V^{k+1}}\|AV^{k+1} - b(V^k)\|^2, \text{ and } g(V^{k+1}) - \tilde{g} = 0 \quad \text{(Eq. 11)}$$

If $h = V^{k+1} - V^k$, then a new function, $l(h) = AV^{k+1} - b(V^k)$, dependent only on $h$ may be provided as follows:

$$l(h) = AV^{k+1} - b(V^k) \quad \text{(Eq. 12)}$$
$$= A(V^k + h) - b(V^k)$$
$$= Ah + AV^k - b(V^k)$$

Thus, equation 11 may be expressed as follows:

$$\min_{h}\|l(h)\|^2, \text{ such that } g(V^k + h) - \tilde{g} = 0 \quad \text{(Eq. 13)}$$

By locally linearizing, $$g(V^k + h) \approx g(V^k) + J_g(V^k)h$$

Further, by applying Lagrange multipliers, a function representing global area preservation may be expressed as follows:

$$h = -(A^T A)^{-1}(A^T S + J_g^T \lambda)$$

Where $\lambda = -(J_g(A^T A)^{-1} J_g^T)^{-1}(t - J_g(A^T A)^{-1} A^T S)$; $J_g$ is the Jacobian of g; $S = b(V^k) - AV^k$; and $t = \tilde{g} - g(V^k)$.

In another example, a computer-readable medium having computer-executable instructions stored thereon is provided in which execution of the computer-executable instructions performs a method as described above. The computer-readable medium may be included in a system or computer and may include, for example, a hard disk, a magnetic disk, an optical disk, a CD-ROM, etc. A computer-readable medium may also include any type of computer-readable storage media that can store data that is accessible by computer such as random access memories (RAMs), read only memories (ROMs), and the like.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

The invention claimed is:

1. A computer storage medium containing computer-executable code for performing a method of deforming a shape comprising a boundary polygon and a local area within the boundary polygon, the method comprising:
receiving an input for deforming the shape;
identifying a first plurality of coordinates associated with vertices on the boundary polygon of the shape, the first plurality of coordinates including Laplacian coordinates;
identifying a second plurality of coordinates associated with vertices in the local area of the shape; and
deforming the shape based on the input to generate a deformed shape by minimizing an energy function corresponding to the Laplacian coordinates, the energy function comprising $\|LV - \delta(V)\|^2$, V being a point position of the boundary polygon, L being a Laplace matrix, and $\delta$ being a vector of Laplacian coordinates, and wherein the first plurality of coordinates and the second plurality of coordinates are preserved during deforming the shape.

2. A computer storage medium containing computer-executable code for performing a method of deforming a shape comprising a boundary polygon and a local area within the boundary polygon, the method comprising:

receiving an input for deforming the shape;

identifying a first plurality of coordinates associated with vertices on the boundary polygon of the shape;

identifying a second plurality of coordinates associated with vertices in the local area of the shape, the second plurality of coordinates includes mean value coordinates; and deforming the shape based on the input to generate a deformed shape including maintaining relative positioning of vertices in the local area of the shape by minimizing an energy function corresponding to the mean value coordinates, and wherein the first plurality of coordinates and the second plurality of coordinates are preserved during deforming the shape.

3. The computer storage medium of claim 2 wherein the energy function comprises $\|MV\|^2$.

4. The computer storage medium of claim 2 wherein second plurality of coordinates includes edge lengths.

5. The computer storage medium of claim 4 wherein deforming the shape includes minimizing an energy function corresponding to the edge lengths.

6. The computer storage medium of claim 5 wherein the energy function comprises:

$$\|HV-e(V)\|^2$$

where H is a $|E_g| \times n$ matrix.

7. The computer readable computer storage medium of claim 2 wherein the first plurality of coordinates includes Laplacian coordinates and the second plurality of coordinates further includes edge lengths.

8. The computer storage medium of claim 7 wherein deforming the shape includes minimizing an energy function corresponding to the Laplacian coordinates, the mean value coordinates, edge lengths, and position constraints.

9. The computer storage medium of claim 8 wherein the energy function comprises $\|L_p V_p - \delta(V_p)\|^2 + \|MV\|^2 + \|HV-e(V)\|^2$.

10. The computer storage medium of claim 8 wherein the energy function comprises $\|L_p V_p - \delta(V_p)\|^2 + \|MV\|^2 + \|HV-e(V)\|^2 + \|CV-U\|^2$.

11. The computer storage medium of claim 2 wherein the step of deforming includes preserving a global area of the shape.

12. A computer-implemented method of deforming a shape performed by a computer, the method comprising:

receiving an input via the computer for deforming the shape;

deforming the shape based on the input received via the computer, wherein the shape includes an outline contour and a local area inside the outline contour, the outline contour comprising a first plurality of vertices and the local area comprising a second plurality of vertices and a plurality of edges, the deforming including computing an energy function associated with the outline contour and the local area, the energy function comprising $\|L_p V_p - \delta(V_p)\|^2 + \|MV\|^2 + \|HV-e(V)\|^2 + \|CV-U\|^2$.

minimizing the energy function during the deforming by reducing an energy level based on a nonlinear least squares function, and determining positions of the vertices in the first plurality of vertices and the second plurality of vertices based on the minimizing 13. The computer-implemented method of claim 12 wherein the energy function comprises a Laplacian coordinate component, a mean value coordinate component and an edge length component.

14. The computer-implemented method of claim 13 wherein minimizing the energy function includes preserving the Laplacian coordinate component, maintaining relative positioning of the vertices in the second plurality of vertices, and preserving lengths of the edges in the plurality of edges.

* * * * *